(12) United States Patent
Fürholz et al.

(10) Patent No.: US 8,071,185 B2
(45) Date of Patent: Dec. 6, 2011

(54) RECORDING SHEET FOR INK JET PRINTING

(75) Inventors: Urs Fürholz, Marly (CH); Vincent Ruffieux, Marly (CH); Meinrad Schär, Ependes (CH)

(73) Assignee: Ilford Imaging Switzerland GmbH (CH)

( * ) Notice: Subject to any disclaimer, the term of this patent is extended or adjusted under 35 U.S.C. 154(b) by 914 days.

(21) Appl. No.: 11/248,696

(22) Filed: Oct. 12, 2005

(65) Prior Publication Data

US 2006/0078696 A1  Apr. 13, 2006

(30) Foreign Application Priority Data

Oct. 13, 2004  (EP) .................................. 04105031

(51) Int. Cl.
*B41M 5/00* (2006.01)
(52) U.S. Cl. ............... 428/32.36; 428/32.25; 428/32.26; 428/32.37
(58) Field of Classification Search .............. 428/32.1, 428/32.25, 32.26, 32.36, 32.37
See application file for complete search history.

(56) References Cited

U.S. PATENT DOCUMENTS

| | | | | |
|---|---|---|---|---|
| 4,554,181 | A * | 11/1985 | Cousin et al. ............... | 428/32.3 |
| 6,589,637 | B2 | 7/2003 | Baettig et al. | |
| 6,660,347 | B2 | 12/2003 | Steiger | |
| 6,773,771 | B1 | 8/2004 | Ashida et al. | |
| 2003/0181566 | A1 | 9/2003 | Chapman et al. | |
| 2003/0224127 | A1* | 12/2003 | Burch et al. ............... | 428/32.1 |
| 2004/0052981 | A1* | 3/2004 | Loccufier et al. ........... | 428/32.1 |
| 2004/0151894 | A1* | 8/2004 | Kado et al. .................. | 428/323 |
| 2004/0197498 | A1* | 10/2004 | Bi et al. ..................... | 428/32.34 |
| 2005/0170109 | A1* | 8/2005 | Chen et al. ................ | 428/32.36 |

FOREIGN PATENT DOCUMENTS

| | | |
|---|---|---|
| DE | 100 20 346 A1 | 11/2000 |
| EP | 0 559 324 A1 | 9/1993 |
| EP | 0 663 620 A2 | 10/1994 |
| EP | 0 663 620 A3 | 10/1994 |
| EP | 0 983 867 A2 | 3/2000 |
| EP | 0 983 867 A3 | 3/2000 |
| EP | 1 197 345 A1 | 4/2002 |
| EP | 1 231 071 A1 | 8/2002 |
| EP | 1 262 455 A1 | 12/2002 |
| GB | 1 342 787 | 1/1974 |
| WO | WO 00/20221 | 4/2000 |
| WO | WO 01/05599 A1 | 1/2001 |
| WO | WO 02/094573 A1 | 11/2002 |

OTHER PUBLICATIONS

Field et. al. , Silica Dispersion . . . Apr. 2000 PCT WO 00/20221.*
S. Brunauer, P.H. Emmett and E. Teller, "Adsorption of Gases in Multimolecular Layers," Journal of the American Chemical Society 60, 309-319 (1938).
Pages 165-169 and 829 of G. Wyszecki and W.S. Stiles, "Color Science: Concepts and Methods, Quantitative Data and Formulae," Wiley-Interscience, 1982, ISBN 0-471-02106-7.
R. Hofmann, E. Baumann and M. Schaer, "Print Performance Evaluation of Ink-jet Media: Gamut, Drying, Permanence," IS&Ts NIP 15: International Conference on Digital Printing Technologies, 1999, ISBN 0-89208-222-4.
Data Sheet of CAB-O-SIL® M-5.
Data Sheet of CAB-O-SIL® H-5.

* cited by examiner

*Primary Examiner* — Gerard Higgins
(74) *Attorney, Agent, or Firm* — Dara L. Onofrio, Esq.; Onofrio Law

(57) ABSTRACT

A method for the preparation of silicon dioxide dispersions is described, wherein the surface of the silicon dioxide is modified by a treatment with the reaction products of a compound of trivalent aluminum with least one aminoorganosilane. These reaction products are formed in a separate reaction step. The present invention also relates to recording sheets for ink jet printing having such a dispersion incorporated in an ink-receiving layer.

15 Claims, No Drawings

RECORDING SHEET FOR INK JET PRINTING

FIELD OF THE INVENTION

The present invention relates to a method of preparation of silicon dioxide dispersions, wherein the surface of the silicon dioxide is modified by a reaction with the reaction products of a compound of trivalent aluminum with at least one aminoorganosilane. These reaction products are formed in a separate reaction step. Furthermore, the present invention relates to recording sheets for ink jet printing containing such a dispersion in an ink-receiving layer

BACKGROUND OF THE INVENTION

Ink jet printing processes are mainly of two types: continuous stream and drop-on-demand.

In continuous stream ink jet printing, a continuous ink stream is emitted under pressure through a nozzle. The stream breaks up into droplets at a certain distance from the nozzle. If a specific location on the recording sheet has to be printed the individual droplets are directed to the recording sheet, otherwise they are directed to a collecting vessel. This is done for example by charging unnecessary droplets in accordance with digital data signals and passing them through an static electric field which adjusts the trajectory of these droplets in order to direct them to the collecting vessel. The inverse procedure may also be used wherein uncharged droplets are collected in the vessel.

In the non-continuous process, or the so-called "drop-on-demand" process, a droplet is generated and expelled from the nozzle in accordance with digital data signals only if a specific location on the recording sheet has to be printed.

The printing speed of modern ink jet printers is ever increasing for economical reasons. Recording sheets suitable for these printers therefore need to absorb the inks very quickly. Especially suitable are recording sheets containing nanocrystalline, nanoporous inorganic compounds, preferably oxides such as aluminum oxides or silicon dioxide, or oxide/hydroxides such as aluminum oxide/hydroxides. Such recording sheets are known as "nanoporous" recording sheets.

Such recording sheets available today do not meet all of the required demands. In particular, in the case where dye-based inks are used for recording, the water fastness and the diffusion fastness of images printed on these recording sheets have to be improved. In the case where pigment-based inks are used for recording, the surface gloss of images printed on these recording sheets has to be improved, because very often the required photo quality is not obtained due to a bad compatibility between the ink-receiving layer and the ink. Particularly disturbing are gloss differences between different parts of the image. Furthermore, the manufacturing process of the known nanoporous recording sheets is not well mastered on an industrial scale.

Patent application DE 10,020,346 describes a recording sheet, which contains silicon dioxide prepared in the gas phase with a size of the primary particles of at most 20 nm, wherein the surface of the silicon dioxide has been modified by a treatment with aluminum chlorohydrate.

Patent application WO 00/20,221 describes the reaction of silicon dioxide prepared in the gas phase with aluminum chlorohydrate. The modified silicon dioxide is incorporated afterwards into an ink-receiving layer of nanoporous recording sheets for ink jet printing.

The described modification procedures show, however, the disadvantage that high quantities of aluminum chlorohydrate are needed in the modification step. Reaction speed is low and the resulting dispersions show bad storage stability due to their high salt content. The dispersions may be used only at a low value of pH, because they gel at higher values of pH. High quantities of the hardener boric acid are needed for hardening these recording sheets.

Patent application WO 02/094,573 describes the use of silicon dioxide prepared in the gas phase in recording sheets for ink jet printing, wherein the surface of the silicon dioxide has been modified by a treatment with aminoorganosilanes.

Patent application WO 01/05,599 describes the use of silicon dioxide pigments in recording sheets for ink jet printing, wherein the surface of the silicon dioxide has been modified by a treatment with cationic aminoorganosiloxanes.

Patent application EP 0,983,867 describes the use of colloidal silicon dioxide in recording sheets for ink jet printing, wherein the surface of the silicon dioxide has been modified by a treatment with silanes of general formula $(R_1)_n Si(OR_2)_{4-n}$, wherein at least one of the substituents $R_1$ contains an amino group.

The described modification procedures show the advantage that only relatively small quantities of aminoorganosilanes are needed in the modification step. The modification reaction occurs in a relatively broad range of values of pH. Only small quantities of the hardener boric acid are needed for hardening these recording sheets due to their higher value of pH.

The described modification procedures show, however, the disadvantage that the aminoorganosilanes are expensive and that the modified dispersions fix negatively charged species only in a relatively narrow range of values of pH.

SUMMARY OF THE INVENTION

An objective of the invention is to provide nanoporous recording sheets with improved image quality (volume of color space, gamut), improved water fastness and improved diffusion fastness of recording sheets printed with dye-based inks.

A further objective of the invention is to provide nanoporous recording sheets with low gloss differences between different parts of the image having different color and densities, of recording sheets printed with pigment-based inks.

A further objective of the invention is an improved manufacturability and an improved storage behavior of the dispersions according to the invention, wherein the surface of the silicon dioxide has been modified with the reaction products of a compound of trivalent aluminum with at least one aminoorganosilane, an improved manufacturability of the coating solutions and an improved coating quality of the recording sheets according to the invention.

Such a recording sheet consists of a support having coated thereon at least one ink-receiving layer containing the surface modified silicon dioxide.

We have now surprisingly found that all these improvements may be obtained with dispersions of silicon dioxide wherein the surface has been modified by a treatment with the reaction products of a compound of trivalent aluminum with at least one aminoorganosilane.

The recording sheets for ink jet printing according to the invention contain, in addition to the modified nanoporous, nanocrystalline silicon dioxide, one or more binders.

DETAILED DESCRIPTION OF THE INVENTION

We have surprisingly found that a nanoporous recording sheet for ink jet printing, containing in its in-receiving layer a dispersion of silicon dioxide, wherein the surface of the silicon dioxide has been modified by a treatment with the reaction products of a compound of trivalent aluminum (such as aluminum chlorohydrate) with at least one aminoorganosilane, shows a considerably improved color rendition in comparison with a recording sheet wherein the surface of the silicon dioxide has been modified by a treatment with aluminum chlorohydrate or by a treatment with an aminoorganosilane. The use of a dispersion according to the invention improves the water fastness and the diffusion fastness of images printed with dye-based inks. Images printed with pigment-based inks on a recording sheet according to the invention show considerably lower gloss differences between different parts of the image having different color densities in comparison with a recording sheet representing the state of the art, wherein the surface of the silicon dioxide has been modified by a treatment with aluminum chlorohydrate.

Surprisingly, we have also found that the manufacturability of the dispersions according to the invention and of the coating solutions is considerably improved and simplified in comparison with the state of the art. Furthermore, the coating quality is considerably improved. In particular, large area coating defects, where the ink-receiving layer is completely missing and where therefore no ink can be absorbed, nearly disappear.

The synthetic silicon dioxide used in the recording sheets according to the invention may be prepared either by precipitation in a wet process (precipitated silicon dioxide) or in a gas phase reaction (fumed silicon dioxide).

Precipitated silicon dioxide may be prepared for example in the wet process by metathesis of sodium silicate with an acid or by passing through a layer of ion-exchange resin as silicon dioxide sol, by heating and maturing of this silicon dioxide sol or by gelling of a silicon dioxide sol.

The gas phase reaction for the preparation of fumed silicon dioxide by flame pyrolysis is also known as a dry process in contrast to the wet process. In this process, for example, silicon tetrachloride is reacted in the presence of hydrogen and oxygen under formation of silicon dioxide and hydrochloric acid. Silanes, such as for example methyltrichlorosilane or trichlorosilane, may be used in this process in place of silicon tetrachloride or in combination with silicon tetrachloride.

Preferably, fumed silicon dioxide is used in the recording sheets according to the invention.

Fumed silicon dioxide consists of aggregates of small primary particles. These primary particles themselves are not porous. The aggregates, however, are porous and may absorb quickly big amounts of liquids for this reason.

The aggregates of fumed silicon dioxide normally have a size (mean diameter) of more than 100 nm. Particles with a size between 100 nm and 500 nm are preferred, particularly preferred are particles with a size between 150 nm and 250 nm. These sizes refer to the aggregates. The primary particles have a size between 1 nm and 100 nm. A size between 1 nm and 30 nm is preferred, particularly preferred is a size between 5 nm and 15 nm.

Fumed silicon dioxide has a specific surface area between 20 $m^2/g$ and 400 $m^2/g$. A specific surface area between 40 $m^2/g$ and 400 $m^2/g$ is preferred. Particularly preferred is a specific surface area between 90 $m^2/g$ and 330 $m^2/g$. The specific surface area is determined by the BET isotherm method, as described by S. Brunauer, P. H. Emmet and I. Teller in "Adsorption of Gases in Multimolecular Layers", Journal of the American Chemical Society 60, 309 (1938).

In a preparation method of the surface modified silicon dioxide according to the invention, which will be incorporated into the recording sheets according to the invention, fumed silicon dioxide is for example added at high shear rates to a mainly aqueous solution containing the reaction products of a compound of trivalent aluminum (such as aluminum chlorohydrate) with of at least one aminoorganosilane. Under suitable conditions, a dispersion of surface modified fumed silicon dioxide is obtained that does not coagulate. The mixture containing the reaction products of a compound of trivalent aluminum (such as aluminum chlorohydrate) with at least one aminoorganosilane shows a high buffer capacity. The alkaline aminoorganosilane neutralizes the hydrochloric acid generated during the hydrolysis of the compound of trivalent aluminum (such as aluminum chlorohydrate). The required quantity of the compound of trivalent aluminum (such as aluminum chlorohydrate) for the surface modification of silicon dioxide is much lower in the modification step according to the invention in comparison to the modification step with aluminum chlorohydrate. The surface modified dispersions of silicon dioxide according to the invention have a much lower salt content in comparison to dispersions where the surface has been modified with aluminum chlorohydrate.

Deionized water is preferably used for the preparation of the mainly aqueous solutions. Water-miscible solvents such as lower alcohols (methanol, ethanol, propanol and the like) or ketones such as acetone may be added.

The reaction products, used in the modification step, of a compound of trivalent aluminum (such as aluminum chlorohydrate) with at least one aminoorganosilane may be prepared by the addition of the aminoorganosilane to an aqueous solution of the compound of trivalent aluminum (such as aluminum chlorohydrate) or vice versa. The reaction of the compound of trivalent aluminum with the aminoorganosilane is carried out at temperatures from 10° C. to 50° C. for 5 minutes to 60 minutes. The reaction is preferably carried out at room temperature for 10 minutes to 15 minutes.

During the reaction of the two starting compounds, Si—O—Al linkages are formed as could be shown by $^{27}Al$ nuclear magnetic resonance spectroscopy. New peaks at 50 ppm to 70 ppm, characteristic for Si—O—Al linkages, appear in the nuclear magnetic resonance spectrum. Their intensity increases with the amount of the aminoorganosilane. The reaction ends after about 10 minutes at room temperature according to the nuclear magnetic resonance measurements.

For the preparation of the surface modified silicon dioxide according to the invention, the reaction products of a compound of trivalent aluminum (such as aluminum chlorohydrate) with at least one aminoorganosilane may also be added, for example, to an aqueous dispersion of silicon dioxide.

The modification of the surface of the silicon dioxide with the reaction products of a compound of trivalent aluminum (such as aluminum chlorohydrate) with at least one aminoorganosilane is a faster process than the surface modification of silicon dioxide with aluminum chlorohydrate. For this reason, the modification time may be shortened or the modification temperature may be lowered when the surface of the silicon dioxide is modified with the reaction products of a compound of trivalent aluminum (such as aluminum chlorohydrate) with at least one aminoorganosilane.

Fumed silicon dioxide is particularly preferred for the surface modification with the reaction products of a compound of trivalent aluminum (such as aluminum chlorohydrate) with at least one aminoorganosilane.

In place of a single fumed silicon dioxide powder, a mixture of different silicon dioxide powders having different sizes of the primary particles may be used. The modification step with the reaction products of a compound of trivalent aluminum (such as aluminum chlorohydrate) with at least one aminoorganosilane may be carried out individually for each silicon dioxide powder or simultaneously with the mixture of the different silicon dioxide powders.

If the modification step is done at high shear rates, the reaction products are regularly distributed on the surface of the silicon dioxide. Furthermore, the rheological behavior of the dispersion is improved.

Preferred compounds of trivalent aluminum are aluminum chloride, aluminum nitrate, aluminum acetate, aluminum formiate and aluminum chlorohydrate.

Suitable aminoorganosilanes are aminoorganosilanes of formula (I)

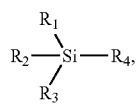

(I)

where
$R_1$, $R_2$, $R_3$ independently represent hydrogen, hydroxyl, unsubstituted or substituted alkyl having from 1 to 6 carbon atoms, unsubstituted or substituted aryl, unsubstituted or substituted alkoxyl having from 1 to 6 carbon atoms or unsubstituted or substituted aryloxyl
and
$R_4$ represents an organic moiety substituted by at least one primary, secondary or tertiary amino group.

In the case where $R_1$, $R_2$ and $R_3$ are substituted, the substituents are independently selected from the group consisting of thiol, sulfide and polyalkylene oxide. Suitably selected substituents facilitate the surface modification of silicon dioxide (improved rheological behavior of the dispersions and of the coating solutions) and improve properties of the recording sheets such as stability against air pollutants, light fastness and physical properties.

Condensation products of the aminoorganosilanes may also be used in place of the monomeric aminoorganosilanes. The condensation reactions may occur between identical or different aminoorganosilanes.

Preferred aminoorganosilanes are 3-aminopropyltrimethoxysilane, N-(2-aminoethyl)-3-aminopropyltrimethoxysilane, (3-triethoxysilylpropyl)-diethylentriamine, 3-aminopropyltriethoxysilane, N-(2-Aminoethyl)-3-aminopropyltriethoxysilane, (3-triethoxysilylpropyl)-diethylenetriamine and their mixtures.

In a particularly preferred embodiment of the invention, the aminoorganosilane is reacted in solution with $CO_2$ under formation of an ammoniumorganosilane (protonated species of an aminoorganosilane) and hydrogen carbonate before it is added to the solution of the trivalent aluminum compound (such as aluminum chlorohydrate). In this way, the value of pH of the reaction mixture containing the reaction products of a compound of trivalent aluminum (such as aluminum chlorohydrate) with at least one aminoorganosilane is lowered and its buffer capacity increased. The formation of undesirable, partially insoluble aluminum byproducts of very high molecular weight is reduced in this procedure. The value of pH during the addition of the unmodified silicon dioxides is nearly unchanged.

The dispersion of the surface modified silicon dioxide according to the invention is advantageously used directly for the preparation of the coating solution of an ink-receiving layer of a recording sheet for ink jet printing. Therefore, the dispersion has to be stable for at least 24 hours without sedimentation of the surface modified silicon dioxide and is not allowed to change its viscosity considerably. In particular, it is not allowed to gel or to coagulate.

The dispersion contains the surface modified silicon dioxide according to the invention in an amount of from 5 percent by weight to 50 percent by weight. Amounts of from 10 percent by weight to 30 percent by weight are preferred, particularly preferred are amounts of from 15 percent by weight to 25 percent by weight.

The surface modification of the silicon dioxide with the reaction products of a compound of trivalent aluminum (such as aluminum chlorohydrate) with at least one aminoorganosilane leads to a positive surface charge of the silicon dioxide. The coloring compounds (dyes or pigments) contained in inks for ink jet printing very often contain groups which may be ionized, such as $SO_3H$, $COOH$, $PO_3H_2$ and the like, increasing the solubility of the dyes and improving the dispersion properties of the pigments. After the dissociation of these groups, the dyes are therefore negatively charged in the mainly aqueous ink liquid and are therefore electrostatically attracted and fixed by the positive charge at the surface of the modified silicon dioxide.

The charge of the surface of the surface modified particles of silicon dioxide may be determined by measuring the zeta potential of the dispersion. The zeta potential increases proportionally with the surface charge. The dispersion of the surface modified silicon dioxide preferably has a positive zeta potential in order to improve fixing of the negatively charged dyes or pigments.

The total amount of the two ingredients used for the preparation of the reaction products has to be chosen in such a way that most of the aggregates of silicon dioxide have the possibility to react with the reaction products of a compound of trivalent aluminum (such as aluminum chlorohydrate) with at least one aminoorganosilane. The total amount depends on the specific compound of trivalent aluminum that is used, on the molecular weight of the aminoorganosilane and the number of amino groups in the molecule.

The quantity of the compound of trivalent aluminum typically is between 0.1 percent by weight and 20 percent by weight relative to the quantity by weight of silicon dioxide. A value between 0.5 percent by weight and 10 percent by weight is preferred.

The total quantity of the aminoorganosilane, respectively the mixture of aminoorganosilanes, typically is between 0.1 percent by weight and 10 percent by weight relative to the quantity by weight of silicon dioxide. A value between 0.5 percent by weight and 10 percent by weight is preferred.

The weight ratio between the compound of trivalent aluminum (such as aluminum chlorohydrate) and the aminoorganosilane is preferably chosen in such a way that the desired value of pH is attained when the two compounds are mixed. A molar ratio between 0.1 and 2.0 is preferred. Particularly preferred is a molar ratio between 0.5 and 1.5, taking into account the number of aluminum atoms and the number of amino groups of the aminoorganosilane.

The value of pH of the mixture containing the reaction products is determined mainly by the ratio of the number of aluminum atoms multiplied by their charge to the total number of amino groups. The substituent $R_4$ of the aminoorganosilane may be chosen with this aspect in mind.

The value of pH of the solution containing the reaction products of the compound of trivalent aluminum with the aminoorganosilane is preferably chosen to be between 3 and 10.

The ratio between the number of silicon atoms and the number of aluminum atoms is important in relation to the structure of the formed reaction products.

The recording sheet may contain, in addition to the surface modified silicon dioxide according to the invention, other, porous or non-porous, inorganic compounds.

In order to improve the stability of images in polluted air, the recording sheet according to the invention may contain, in addition to the surface modified silicon oxide, salts of monovalent copper such as copper(I) chloride, copper(I) bromide or copper(I) sulfite monohydrate as described in patent application EP 1,231,071.

In order to further improve the stability of images in polluted air, the recording sheet may contain, in addition to the salts of monovalent copper, diketo compounds as described in patent application EP 1,197,345.

In order to improve still further the stability of images in polluted air, the recording sheet may contain in addition organic sulfur compounds such as thiodiethylene glycol.

The binders are in most cases water-soluble polymers. Especially preferred are film-forming polymers.

The water-soluble polymers include for example natural polymers or modified products thereof such as albumin, gelatin, casein, starch, gum arabicum, sodium or potassium alginate, hydroxyethyl cellulose, carboxymethyl cellulose, $\alpha$-, $\beta$- or $\gamma$-cyclodextrine and the like. In the case where one of the water-soluble polymers is gelatin, all known types of gelatin may be used as for example acid pigskin or limed bone gelatin, acid or base hydrolyzed gelatin, but also derivatized gelatins like for instance phthalaoylated, acetylated or carbamoylated gelatin or gelatin derivatized with the anhydride of trimellitic acid.

Synthetic binders may also be used and include for example polyvinyl alcohol, polyvinyl pyrrolidone, completely or partially saponified products of copolymers of vinyl acetate and other monomers; homopolymers or copolymers of unsaturated carboxylic acids such as maleic acid, (meth)acrylic acid or crotonic acid and the like; homopolymers or copolymers of sulfonated vinyl monomers such as vinylsulfonic acid, styrene sulfonic acid and the like. Furthermore homopolymers or copolymers of vinyl monomers of (meth)acrylamide; homopolymers or copolymers of other monomers with ethylene oxide; polyurethanes; polyacrylamides; water-soluble nylon type polymers; polyesters; polyvinyl lactams; acrylamide polymers; substituted polyvinyl alcohol; polyvinyl acetals; polymers of alkyl and sulfoalkyl acrylates and methacrylates; hydrolyzed polyvinyl acetates; polyamides; polyvinyl pyridines; polyacrylic acid; copolymers with maleic anhydride; polyalkylene oxides; copolymers with methacrylamide and copolymers with maleic acid may be used. All these polymers may also be used as mixtures.

Preferred synthetic binders are polyvinyl alcohol and polyvinyl pyrrolidone or mixtures thereof.

These polymers may be blended with water insoluble natural or synthetic high molecular weight compounds, particularly with acrylate latices or with styrene acrylate latices.

Although not specifically claimed in this invention, water insoluble polymers are nevertheless considered part of the system.

The polymers mentioned above having groups with the possibility to react with a cross-linking agent may be cross-linked or hardened to form essentially water insoluble layers. Such cross-linking bonds may be either covalent or ionic. Cross-linking or hardening of the layers allows for the modification of the physical properties of the layers, like for instance their liquid absorption capacity or their resistance against layer damage.

The cross-linking agents or hardeners are selected depending on the type of the water-soluble polymers to be cross-linked.

Organic cross-linking agents and hardeners include for example aldehydes (such as formaldehyde, glyoxal or glutaraldehyde), N-methylol compounds (such as dimethylol urea or methylol dimethylhydantoin), dioxanes (such as 2,3-dihydroxydioxane), reactive vinyl compounds (such as 1,3,5-trisacrylolyl hexahydro-s-triazine or bis-(vinylsulfonyl) ethyl ether), reactive halogen compounds (such as 2,4-dichloro-6-hydroxy-s-triazine); epoxides; aziridines; carbamoyl pyridinium compounds or mixtures of two or more of the above mentioned cross-linking agents.

Inorganic cross-linking agents or hardeners include for example chromium alum, aluminum alum or, preferably, boric acid.

The layers may also contain reactive substances that cross-link the layers under the influence of ultraviolet light, electron beams, X-rays or heat.

The layers may further be modified by the addition of fillers. Possible fillers are for instance kaolin, Ca- or Ba-carbonates, silicon dioxide, titanium dioxide, bentonites, zeolites, aluminum silicate or calcium silicate. Organic inert particles such as polymer beads may also be used. These beads may consist of polyacrylates, polyacrylamides, polystyrene or different copolymers of acrylates and styrene. The fillers are selected according to the intended use of the printed images. Some of these compounds cannot be used if the printed images are to be used as transparencies. However they are of interest in cases where the printed images are be to used as remission pictures. Very often, the introduction of such fillers causes a wanted matte surface.

The recording sheets may also contain water-soluble metal salts, as for example salts of the alkaline earth metals or salts of the metals of the rare earth series.

The recording sheets according to the invention comprise a support having coated thereon at least one ink-receiving layer, and, optionally, auxiliary layers.

A wide variety of supports are known and commonly used in the art. They include all those supports used in the manufacture of photographic materials. This includes clear films made from cellulose esters such as cellulose triacetate, cellulose acetate, cellulose propionate or cellulose acetate/butyrate, polyesters such as polyethylene terephthalate or polyethylene naphthalate, polyamides, polycarbonates, polyimides, polyolefins, polyvinyl acetals, polyethers, polyvinyl chloride and polyvinylsulfones. Polyester film supports, and especially polyethylene terephthalate or polyethylene naphthalate are preferred because of their excellent dimensional stability characteristics. The usual opaque supports used in the manufacture of photographic materials may be used including for example baryta paper, polyolefin coated papers or voided polyester as for instance Melinex® manufactured by DuPont. Especially preferred are polyolefin coated papers or voided polyester.

When such supports, in particular polyester, are used, a subbing layer is advantageously coated first to improve the bonding of the ink-receiving layers to the support. Useful subbing layers for this purpose are well known in the photographic industry and include for example terpolymers of vinylidene chloride, acrylonitrile and acrylic acid or of vinylidene chloride, methyl acrylate and itaconic acid. In place of the use of a subbing layer, the surface of the support may be subjected to a corona-discharge treatment before the coating process.

Uncoated papers, comprising all different types of papers, varying widely in their composition and in their properties, and pigmented papers and cast-coated papers may also be used, as well as metal foils, such as foils made from aluminum.

The layers may also be coated onto textile fiber materials consisting for example of polyamides, polyesters, cotton, viscose and wool.

The ink-receiving layers according to the invention are in general coated from aqueous solutions or dispersions containing all necessary ingredients. In many cases, wetting agents are added to those coating solutions in order to improve the coating behavior and the evenness of the layers. Besides being necessary for coating purposes, these compounds may have an influence on the image quality and may therefore be selected with this specific objective in mind. Although not specifically claimed in this invention, wetting agents nevertheless form an important part of the invention.

In addition to the above mentioned ingredients, recording sheets according to the invention may contain additional compounds aimed at further improving their performance, as for example brightening agents to improve the whiteness, such as stilbenes, coumarines, triazines, oxazoles or others compounds known to someone skilled in the art.

Light stability may be improved by adding UV absorbers such as 2-hydroxybenzotriazoles, 2-hydroxybenzophenones, derivatives of triazine or derivatives of cinnamic acid. The amount of UV absorber may vary from 200 mg/m$^2$ to 2000 mg/m$^2$, preferably from 400 mg/m$^2$ to 1000 mg/m$^2$. The UV absorber may be added to any of the layers of the recording sheet according to the invention. It is preferred that, however, if it is added, it should be added to the topmost layer.

It is further known that images produced by ink jet printing may be protected from degradation by the addition of radical scavengers, stabilizers, reducing agents and antioxidants. Examples of such compounds are sterically hindered phenols, sterically hindered amines, chromanols, ascorbic acid, phosphinic acids and their derivatives, sulfur containing compounds such as sulfides, mercaptans, thiocyanates, thioamides or thioureas.

The above-mentioned compounds may be added to the coating solutions as aqueous solutions. In the case where these compounds are not sufficiently water-soluble, they may be incorporated into the coating solutions by other common techniques known in the art. The compounds may for example be dissolved in a water miscible solvent such as lower alcohols, glycols, ketones, esters, or amides. Alternatively, the compounds may be added to the coating solutions as fine dispersions, as oil emulsions, as cyclodextrine inclusion compounds or incorporated into latex particles.

Typically, the recording sheet according to the invention has a thickness in the range of 0.5 µm to 100 µm dry thickness, preferably in the range of 5 µm to 50 µm dry thickness.

The coating solutions may be coated onto the support by any number of suitable procedures. Usual coating methods include for example extrusion coating, air knife coating, doctor blade coating, cascade coating and curtain coating. The coating solutions may also be applied using spray techniques. The ink-receiving layers may be built up from several individual layers that can be coated one after the other or simultaneously.

The individual ink-receiving layers may be different in respect to the used fumed silicon dioxide (in particular its specific surface area), the modification with the reaction products of a compound of trivalent aluminum with at least one aminoorganosilane, the ratio between the binders and the silicon dioxide and the quantity of hardener, in particular boric acid.

It is likewise possible to coat a support on both sides with ink-receiving layers. It is also possible to coat an antistatic layer or an anticurl layer on the backside. The selected coating method however is not to be considered limiting for the present invention.

Inks for ink jet printing consist in essence of a liquid vehicle and a dye or pigment dissolved or suspended therein. The liquid vehicle for ink jet inks consists in general of water or a mixture of water and a water-miscible organic solvent such as ethylene glycol, higher molecular weight glycols, glycerol, dipropylene glycol, polyethylene glycol, amides, polyvinyl pyrrolidone, N-methylpyrrolidone, cyclohexyl pyrrolidone, carboxylic acids and their esters, ethers, alcohols, organic sulfoxides, sulfolane, dimethylformamide, dimethylsulfoxide, cellosolve, polyurethanes, acrylates and the like.

The non-aqueous parts of the ink generally serve as humefactants, cosolvents, viscosity regulating agents, ink penetration additives or drying agents. The organic compounds have in most cases a boiling point, which is higher than that of water. In addition, aqueous inks used for printers of the continuous stream type may contain inorganic or organic salts to increase their conductivity. Examples of such salts are nitrates, chlorides, phosphates and salts of water-soluble organic acids such as acetates, oxalates and citrates. The dyes and pigments suitable for the preparation of inks useable with the recording sheets according to the invention cover practically all classes of known coloring compounds. Dyes or pigments typically used for this purpose are described in patent application EP 0,559,324. The recording sheets according to the invention are meant to be used in conjunction with most of the inks representing the state of the art.

The inks may further contain other additives such as surfactants, optical brighteners, UV absorbers, light stabilizers, biocides, precipitating agents such as multivalent metal compounds and polymeric additives.

This description of inks is for illustration only and is not to be considered as limiting for the purpose of the invention.

The present invention will be illustrated in more detail by the following examples without limiting the scope of the invention in any way.

Test Methods

1. Volume of Color Space (Gamut)

Patches of the colors yellow, red, magenta, blue, cyan, green and black at 100% print density were printed onto the recording sheets according to the invention with the ink jet printers Epson 890, Canon S 900 and HP 970 using the corresponding original inks. The following printer settings were used:

HP 970: Photo REt, Best, HP Premium Photo Paper, Glossy

Epson 890: PQ Glossy Film, 720 dpi, No Color Adjust

Canon S 900: Photo Paper Pro, High, Graphic, Normal

The L*a*b* color coordinates of the colors yellow, red, magenta, blue, cyan, green, black and white were measured and the volume of the color space L*a*b* formed by these eight colors was calculated using the formulae of G. Wyszecki and W. Stiles in "Color Science Concepts and Methods, Quantitative Data and Formulae", John Wiley & Sons, 2. edition 1982, ISBN 0-471-02106-7, pages 164-169 and page 829. The L*a*b* color coordinates of the printed transparent recording sheets were measured while these were in contact with a white, reflecting surface.

Calculations of the volume of color space depend on many variables such as density, printer settings and relative humidity. These variables were kept the same for all recording sheets.

2. Dye Diffusion

The method used is described essentially by R. Hofmann, E. Baumann and M. Schär in "Print Performance Evaluation of Ink-jet Media: Gamut, Drying, Permanence", IS&Ts NIP 15: International Conference on Digital Printing Technologies, ISBN 0-89208-222-4, pages 408-411.

Patches of the colors yellow, red, magenta, blue, cyan, green and black at 100% print density were printed onto the recording sheets according to the invention with the ink jet printers HP 5652, Canon I 990 and Epson R 300 using the corresponding original inks. The printed color patches have an edge length of 118 pixels. Each individual color patch is divided by 11 horizontal and 11 vertical white lines into 144 individual colored squares having an edge length of 8 pixels. The white lines have a width of 2 pixels. The following printer settings were used:

HP 5652: HP Premium High-Gloss Film, Photo REt
Canon I 990: Photo Paper Pro, High, Graphic, Normal
Epson R 300: Premium Glossy Photo Paper, Photo, HS on, ICM, No Color Adjustment The printed recording sheets were dried for 24 hours at a temperature of 23° C. at relative humidity of 50%. Then, the optical densities of the color patches were measured. Afterwards, the printed recording sheets were stored for 7 days at a temperature of 40° C. and relative humidity of 80%. Finally, the optical densities were re-measured.

The value of dye diffusion is the percent difference of the optical densities of the patch of highest density before and after storage.

3. Color Shift in Gray Patches

Gray patches at 30%, 40% and 60% print density were printed onto the recording sheets according to the invention with the ink jet printers HP 5652, Canon I 990 and Epson R 300 using the corresponding original yellow, magenta and cyan inks. The following printer settings were used:

HP 5652: HP Premium High-Gloss Film, Photo REt
Canon I 990: Photo Paper Pro, High, Graphic, Normal
Epson R 300: Premium Glossy Photo Paper, Photo, HS on, ICM, No Color Adjustment The printed recording sheets were dried for 24 hours at a temperature of 23° C. at relative humidity of 50%. Then, their L*a*b* color coordinates were determined. Afterwards, the printed recording sheets were stored for 7 days at a temperature of 40° C. and relative humidity of 80%. Finally, L*a*b* color coordinates were re-determined.

The color change $\Delta E^*$ of each gray patch occurring during storage was determined from the measured values of L*a*b* by using the following formula:

$$\Delta E^* = \sqrt{(\Delta L^*)^2 + (\Delta a^*)^2 + (\Delta b^*)^2}$$

The highest of the three calculated values of $\Delta E^*$ is given as an indication of color shift.

4. Gloss with Pigment Inks

Rectangular patches of size 3 cm×4 cm of 3K black were printed in 10% steps from 0% to 100% print density onto the recording sheets according to the invention with the ink jet printers Epson 2100 and Epson R 800 using the original pigment inks. The following printer settings were used:

Epson 2100: Glossy Paper P-W, 720 dpi, No color adjustment, HS off
Epson R 800: Premium Glossy Photo Paper, Photo, Gloss Auto, HS on, ICM, No color adjustment.

The gloss of the patches with 50% density was measured at an angle of 20° relative to the sample surface with a gloss-measuring device Byk-Gardner Micro-Tri-Gloss.

5. Coating Quality

The coating quality was determined optically. Typical sizes of coating defects are:

Micro crack: 100 μm-500 μm
Layer splitting: 3 mm-10 mm.

EXAMPLES

Example 1

Dispersion 8.8 g of aluminum chlorohydrate (Locron P, available from Clariant AG, Muttenz, Switzerland) were dissolved at a temperature of 20° C. in 782 g of deionized water and 8.8 g of N-(2-aminoethyl)-3-aminopropyltrimethoxysilane (available from Degussa, Düsseldorf, Germany) were added under vigorous stirring. After a reaction time of 15 minutes (Formation of the reaction products from aluminum chlorohydrate with the aminoorganosilane), 200 g of fumed silicon dioxide (Cab-O-Sil® M-5, available from Cabot Corporation, Billerica, USA) were added in small amounts under vigorous stirring at high shear rates. Then, the dispersion was stirred with a rotor-stator-mixer for 15 minutes. Afterwards the dispersion was heated to a temperature of 60° C. and kept for one hour at this temperature in order to modify the surface of the silicon dioxide. The dispersion had the properties indicated in Table 1:

TABLE 1

| Property | Value |
| --- | --- |
| pH | 4.85 |
| Content of silicon dioxide | 20 percent by weight |
| Viscosity | 50 mPas |
| Mean particle size | 42 nm |
| Zeta potential | +31 mV |

Coating Solution 4.8 g of solid boric acid were added at a temperature of 45° C. to 600 g of this dispersion. After the dissolution of the boric acid 300 g of an aqueous solution of polyvinyl alcohol (10%, available as Mowiol 4088 from Clariant AG, Muttenz, Switzerland) were added and afterwards 0.8 g of an aqueous solution of the wetting agent Olin 10G (5.23%, available from Arch Chemicals, Norwalk, USA). At the end, the coating solution was diluted with deionized water to a final weight of 1000 g.

Coating 140 g/m² of this coating solution were coated at a temperature of 40° C. with a bar coater onto a polyethylene terephthalate support. The coated support was then dried for 60 minutes at a temperature of 35° C. 1 m² of the coated support contains 16.8 g of non-modified fumed silicon dioxide.

Example 2

Dispersion 8.8 g of aluminum chlorohydrate were dissolved at a temperature of 20° C. in 782 g of deionized water and 8.8 g of N-(2-aminoethyl)-3-aminopropyltrimethoxysilane were added under vigorous stirring. After a reaction time of 15 minutes (Formation of the reaction products from aluminum chlorohydrate with the aminoorganosilane), 200 g of fumed silicon dioxide (Cab-O—Sil® H-5, available from Cabot Corporation, Billerica, USA) were added in small amounts under vigorous stirring at high shear rates. Then, the dispersion was stirred with a rotor-stator-mixer for 15 minutes. Afterwards the dispersion was heated to a temperature of 60° C. and kept for one hour at this temperature in order to modify the surface of the silicon dioxide. The dispersion had the properties indicated in Table 2:

TABLE 2

| Property | Value |
| --- | --- |
| pH | 4.90 |
| Content of silicon dioxide | 20 percent by weight |
| Viscosity | 60 mPas |
| Mean particle size | 40 nm |
| Zeta potential | +29 mV |

Coating Solution 4.8 g of solid boric acid were added at a temperature of 45° C. to 600 g of this dispersion. After the dissolution of the boric acid 300 g of an aqueous solution of polyvinyl alcohol Mowiol 4088 (10%) were added and afterwards 0.8 g of an aqueous solution of the wetting agent Olin 10G (5.23%) At the end, the coating solution was diluted with deionized water to a final weight of 1000 g.

Coating 140 g/m² of this coating solution were coated at a temperature of 40° C. with a bar coater onto a polyethylene terephthalate support. The coated support was then dried for 60 minutes at a temperature of 35° C. 1 m² of the coated support contains 16.8 g of non-modified fumed silicon dioxide.

Comparative Example C-1

Dispersion 200 g of fumed silicon dioxide Cab-O-Sil® M-5 were added in small amounts under vigorous stirring at high shear rates at a temperature of 20° C. to a mixture of 764 g of deionized water, 8.8 g of aluminum chlorohydrate and 2.0 g of potassium hydroxide. Then, the dispersion was stirred with a rotor-stator-mixer for 15 minutes. Afterwards the dispersion was heated to a temperature of 60° C. and kept for 3 hours at this temperature in order to modify the surface of the silicon dioxide. The dispersion had the properties indicated in Table 3:

TABLE 3

| Property | Value |
| --- | --- |
| pH | 3.40 |
| Content of silicon dioxide | 20 percent by weight |
| Viscosity | 20 mPas |
| Mean particle size | 46 nm |
| Zeta potential | +30 mV |

Coating Solution 4.8 g of solid boric acid were added at a temperature of 45° C. to 600 g of this dispersion. After the dissolution of the boric acid 300 g of an aqueous solution of polyvinyl alcohol Mowiol 4088 (10%) were added and afterwards 0.8 g of an aqueous solution of the wetting agent Olin 10G (5.23%) At the end, the coating solution was diluted with deionized water to a final weight of 1000 g.

Coating 140 g/m² of this coating solution were coated at a temperature of 40° C. with a bar coater onto a polyethylene terephthalate support. The coated support was then dried for 60 minutes at a temperature of 35° C. 1 m² of the coated support contains 16.8 g of non-modified fumed silicon dioxide.

Comparative Example C-2

Dispersion 200 g of fumed silicon dioxide Cab-O-Sil® M-5 were added in small amounts under vigorous stirring at high shear rates at a temperature of 20° C. to a mixture of 788 g of deionized water and 0.77 g of hydrochloric acid (37%). Stirring was continued for 10 minutes. Then, 11.4 g of an aqueous solution of N-(2-aminoethyl)-3-aminopropyltrimethoxysilane (10%) were added slowly under vigorous stirring at high shear rates. The resulting dispersion was stirred with a rotor-stator-mixer for 15 minutes. Afterwards the dispersion was heated to a temperature of 60° C. and kept for one hour at this temperature in order to modify the surface of the silicon dioxide. The dispersion had the properties indicated in Table 4:

TABLE 4

| Property | Value |
| --- | --- |
| pH | 4.10 |
| Content of silicon dioxide | 20 percent by weight |
| Viscosity | 20 mPas |
| Mean particle size | 36 nm |
| Zeta potential | +29 mV |

Coating Solution 4.8 g of solid boric acid were added at a temperature of 45° C. to 600 g of this dispersion. After the dissolution of the boric acid 300 g of an aqueous solution of polyvinyl alcohol Mowiol 4088 (10%) were added and afterwards 0.8 g of an aqueous solution of the wetting agent Olin 10G (5.23%) At the end, the coating solution was diluted with deionized water to a final weight of 1000 g.

Coating 140 g/m² of this coating solution were coated at a temperature of 40° C. with a bar coater onto a polyethylene terephthalate support. The coated support was then dried for 60 minutes at a temperature of 35° C. 1 m² of the coated support contains 16.8 g of non-modified fumed silicon dioxide.

Example 3

Dispersion 88 g of an aqueous solution of N-(2-aminoethyl)-3-aminopropyltrimethoxysilane (10%) were saturated with gaseous $CO_2$. The value of pH fell from 10.8 to 6.8. This solution was added under vigorous stirring to a solution of 8.8 g of aluminum chlorohydrate in 702 g of deionized water. After a reaction time of 15 minutes (Formation of the reaction products from aluminum chlorohydrate with the aminoorganosilane) the value of pH was 6.1 (it was 8.2 after mixing of the two solutions), 200 g of fumed silicon dioxide Cab-O-Sil® M-5 were added in small amounts under vigorous stirring at high shear rates. Then, the dispersion was stirred with a rotor-stator-mixer for 15 minutes. Afterwards the dispersion was heated to a temperature of 60° C. and kept for one hour at this temperature in order to modify the surface of the silicon dioxide. The dispersion had the properties indicated in Table 5:

TABLE 5

| Property | Value |
| --- | --- |
| pH | 5.20 |
| Content of silicon dioxide | 20 percent by weight |
| Viscosity | 30 mPas |
| Mean particle size | 39 nm |
| Zeta potential | +34 mV |

Coating Solution 4.8 g of solid boric acid were added at a temperature of 45° C. to 600 g of this dispersion. After the dissolution of the boric acid 300 g of an aqueous solution of polyvinyl alcohol Mowiol 4088 (10%) were added and afterwards 0.8 g of an aqueous solution of the wetting agent Olin 10G (5.23%) At the end, the coating solution was diluted with deionized water to a final weight of 1000 g.

Coating 140 g/m² of this coating solution were coated at a temperature of 40° C. with a bar coater onto a polyethylene terephthalate support. The coated support was then dried for 60 minutes at a temperature of 35° C. 1 m² of the coated support contains 16.8 g of non-modified fumed silicon dioxide.

Example 4

Dispersion 6.25 g of aluminum nitrate nonahydrate (available from Fluka Chemie AG, Buchs, Switzerland) were dissolved at a temperature of 20° C. in 785 g of deionized water and 8.8 g of N-(2-aminoethyl)-3-aminopropyltrimethoxysilane were added under vigorous stirring. After a reaction time of 15 minutes (Formation of the reaction products from aluminum nitrate nonahydrate with the aminoorganosilane), 200 g of fumed silicon dioxide Cab-O-Sil® M-5 were added in small amounts under vigorous stirring at high shear rates. Then, the dispersion was stirred with a rotor-stator-mixer for 15 minutes. Afterwards the dispersion was heated to a temperature of 60° C. and kept for one hour at this temperature in order to modify the surface of the silicon dioxide. The dispersion had the properties indicated in Table 6:

TABLE 6

| Property | Value |
| --- | --- |
| pH | 4.69 |
| Content of silicon dioxide | 20 percent by weight |
| Viscosity | 27 mPas |
| Mean particle size | 40 nm |
| Zeta potential | +32 mV |

Coating Solution 4.8 g of solid boric acid were added at a temperature of 45° C. to 600 g of this dispersion. After the dissolution of the boric acid 300 g of an aqueous solution of polyvinyl alcohol Mowiol 4088 (10%) were added and afterwards 0.8 g of an aqueous solution of the wetting agent Olin 10G (5.23%). At the end, the coating solution was diluted with deionized water to a final weight of 1000 g.

Coating 140 g/m² of this coating solution were coated at a temperature of 40° C. with a bar coater onto a polyethylene terephthalate support. The coated support was then dried for 60 minutes at a temperature of 35° C. 1 m² of the coated support contains 16.8 g of non-modified fumed silicon dioxide.

Example 5 and Comparative Example C-5

Example 5 and comparative example C-5 are essentially the same as example 1 and comparative example C-1. The coating solutions of example 1 and comparative example C-1 were curtain coated onto a polyethylene coated paper support and the quantity of non-modified fumed silicon dioxide was increased to 21.0 g/m².

Results

The calculated volumes of color space are listed in Table 7.

TABLE 7

| | Volume of color space | | |
| --- | --- | --- | --- |
| Example | Printer CANON S 900 | Printer EPSON 890 | Printer HP 970 |
| 1 | 513'000 | 490'000 | 338'000 |
| C-1 | 457'000 | 464'000 | 286'000 |
| C-2 | 476'000 | 459'000 | 277'000 |
| 2 | 555'000 | 556'000 | 358'000 |

A comparison of the results in Table 7 immediately shows that the volume of color space of the recording sheet for ink jet printing according to the invention, where the surface of the fumed silicon dioxide has been modified with the reaction products of aluminum chlorohydrate and the aminoorganosilane N-(2-aminoethyl)-3-aminopropyltrimethoxysilane (example 1) is considerably bigger for the three printers in comparison to the comparative examples, where the surface of the fumed silicon dioxide has been modified either with aluminum chlorohydrate (comparative example C-1) or with the aminoorganosilane N-(2-aminoethyl)-3-aminopropyltrimethoxysilane (comparative example C-2).

The recording sheet with the surface modified silicon dioxide Cab-O—Sil® H-5 (example 2) has a still bigger volume of color space in comparison to the recording sheet with the surface modified silicon dioxide Cab-O—Sil® M-5 (example 1) due to its smaller medium size.

The results of gloss measurements are listed in Table 8.

TABLE 8

| | Gloss of 3K black | |
| --- | --- | --- |
| Example | Printer EPSON 2100 | Printer EPSON R 800 |
| 5 | 49.2% | 77.8% |
| C-5 | 29.6% | 44.1% |

A comparison of the results in Table 8 immediately shows that recording sheet for ink jet printing according to the invention, where the surface of the fumed silicon dioxide has been modified with the reaction products of aluminum chlorohydrate and the aminoorganosilane N-(2-aminoethyl)-3-aminopropyltrimethoxysilane (example 5) shows for both printers a much higher gloss in comparison to comparative example C-5, where the surface of the fumed silicon dioxide has been modified with aluminum chlorohydrate.

The results of the determination of coating quality are listed in Table 9.

TABLE 9

| Example | Coating quality | |
|---|---|---|
| | Number of minicracks per A4 sheet | Number of layer splittings per 450 m² |
| 5 | 2 | 0 |
| C-5 | 50 | 12 |

A comparison of the results in Table 9 immediately shows that the recording sheet for ink jet printing according to the invention, where the surface of the fumed silicon dioxide has been modified with the reaction products of aluminum chlorohydrate and the aminoorganosilane N-(2-aminoethyl)-3-aminopropyltrimethoxysilane (example 5), shows a considerably improved coating quality in comparison to a recording sheet where the surface of the fumed silicon dioxide has been modified with aluminum chlorohydrate (comparative example C-5).

The results of dye diffusion are listed in Table 10, also in comparison to the commercially available nanoporous recording sheets ILFORD Smooth Gloss, Epson PGPP and Mitsubishi SG 2575.

TABLE 10

| | Dye diffusion (%) | | |
|---|---|---|---|
| Example | Printer HP 5652 | Printer Canon I 990 | Printer Epson R 300 |
| 5 | 36.5 | 53.2 | 13.3 |
| C-5 | 73.5 | 74.6 | 39.2 |
| ILFORD Smooth Gloss | 69.3 | 88.2 | 29.3 |
| Epson PGPP | 73.5 | 80.0 | 26.5 |
| Mitsubishi SG 2575 | 77.8 | 88.2 | 25.0 |

The results in Table 10 clearly show that the recording sheet for ink jet printing according to the invention, where the surface of the fumed silicon dioxide has been modified with the reaction products of aluminum chlorohydrate and the aminoorganosilane N-(2-aminoethyl)-3-aminopropyltrimethoxysilane (example 5), shows a considerably reduced dye diffusion in comparison to a recording sheet, where the surface of the fumed silicon dioxide has been modified with aluminum chlorohydrate (comparative example C-5). The recording sheet according to the invention also showed considerably reduced dye diffusion in comparison to the commercially available nanoporous recording sheets ILFORD Smooth Gloss, Epson PGPP and Mitsubishi SG 2575.

The results of the determination of the color shift in gray patches are listed in Table 11.

TABLE 11

| | Color shift | | |
|---|---|---|---|
| Example | Printer HP 5652 | Printer Canon I 990 | Printer Epson R 300 |
| 5 | 1.7 | 9.3 | 4.9 |
| C-5 | 6.8 | 11.4 | 9.1 |
| ILFORD Smooth Gloss | 8.2 | 11.8 | 5.1 |
| Epson PGPP | 5.5 | 13.6 | 6.4 |
| Mitsubishi SG 2575 | 6.1 | 12.5 | 8.7 |

The results in Table 11 clearly show that the recording sheet for ink jet printing according to the invention, where the surface of the fumed silicon dioxide has been modified with the reaction products of aluminum chlorohydrate and the aminoorganosilane N-(2-aminoethyl)-3-aminopropyltrimethoxysilane (example 5), shows a considerably reduced color shift in gray patches in comparison to a recording sheet where the surface of the fumed silicon dioxide has been modified with aluminum chlorohydrate (comparative example C-5). The recording sheet according to the invention also showed a considerably reduced color shift in gray patches in comparison to the commercially available nanoporous recording sheets ILFORD Smooth Gloss, Epson PGPP and Mitsubishi SG 2575.

Finally, variations from the examples given herein are possible in view of the above disclosure. Therefore, although the invention has been described with reference to certain preferred embodiments, it will be appreciated that other binders may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

The invention claimed is:

1. A recording sheet for ink jet printing having coated onto a support at least one ink-receiving layer consisting of at least one binder and at least one dispersion of surface modified silicon dioxide, wherein the surface of the silicon dioxide consists of the reaction products of a compound of trivalent aluminum selected from the group consisting of aluminum chloride, aluminum nitrate, aluminum acetate, aluminum formiate, aluminum chlorohydrate and mixtures thereof with at least one aminoorganosilane;

wherein said dispersion of surface modified silicon dioxide primary particle size is between 1 nm and 30 nm; a quantity of said compound of trivalent aluminum is between 0.1 percent by weight and 20 percent by weight relative to the quantity by weight of said silicon dioxide; a quantity of said aminoorganosilane is between 0.1 percent by weight and 10 percent by weight relative to the quantity by weight of said silicon dioxide; and a molar ratio of said compound of trivalent aluminum and said aminoorganosilane is between 0.1 and 2.0.

2. The recording sheet according to claim 1, wherein said binder is selected from the group consisting of polyvinyl alcohol, gelatin, derivatives of polyvinyl alcohol, polyvinylpyrrolidone and mixtures thereof.

3. The recording sheet according to claim 1, wherein the recording sheet is hardened with boric acid.

4. The recording sheet according to claim 1, wherein the recording sheet contains a plurality of ink-receiving layers.

5. The recording sheet according to claim 4, wherein each ink-receiving layer contains as the surface modified silicon dioxide a fumed silicon dioxide having a different specific surface area.

6. The recording sheet according to claim 4, wherein each ink-receiving layer contains as the surface modified silicon dioxide a fumed silicon dioxide wherein the surface of the silicon dioxide consists of the reaction products of the compound of trivalent aluminum selected from the group consisting of aluminum chloride, aluminum nitrate, aluminum acetate, aluminum formiate, aluminum chlorohydrate and mixtures thereof with the at least one aminoorganosilane.

7. The recording sheet according to claim 4, wherein each ink-receiving layer has a different ratio of binder to silicon dioxide.

8. The recording sheet according to claim 4, wherein each ink-receiving layer is hardened with different amounts of boric acid.

9. The recording sheet according to claim 1, wherein said support is selected from the group consisting of coated or uncoated paper, transparent or opaque polyester or polypropylene and fibrous textile materials.

10. The recording sheet according to claim 1, wherein the recording sheet is manufactured by extrusion coating, air knife coating, doctor blade coating, cascade coating or curtain coating.

11. The recording sheet according to claim 1, wherein said reaction products contain Al—O—Si linkages.

12. The recording sheet according to claim 1, wherein the quantity of said compound of trivalent aluminum is from 0.5 to 10 percent by weight relative to the quantity by weight of silicon dioxide.

13. The recording sheet according to claim 1, wherein the quantity of said aminoorganosilane is from 0.5 to 10 percent by weight relative to the quantity by weight of silicon dioxide.

14. The recording sheet according to claim 1, wherein said silicon dioxide is fumed silicon dioxide.

15. The recording sheet according to claim 14, wherein said fumed silicon dioxide has a specific surface area between 20 $m^2/g$ and 400 $m^2/g$.

\* \* \* \* \*